United States Patent
Alterman et al.

[11] Patent Number: 6,041,045
[45] Date of Patent: Mar. 21, 2000

[54] METHOD FOR ACCESSING AN INFORMATION NETWORK FROM A RADIO COMMUNICATION SYSTEM

[75] Inventors: Steven S. Alterman, Davie; Mauricio E. Sanchez, Pembroke Pines; Audrey Longhurst, Weston, all of Fla.

[73] Assignee: Motorola, Inc., Schaumburg, Ill.

[21] Appl. No.: 08/794,560

[22] Filed: Feb. 3, 1997

[51] Int. Cl.[7] .................................................. H04L 12/46
[52] U.S. Cl. ........................... 370/313; 370/352; 370/401
[58] Field of Search ................................... 370/310, 349, 370/352, 353, 354, 355, 356, 401, 404, 405, 410, 313, 314; 455/433, 434, 445, 461; 379/93.17, 93.23, 93.24, 93.25

[56] References Cited

U.S. PATENT DOCUMENTS

| | | | |
|---|---|---|---|
| 5,001,471 | 3/1991 | Snowden et al. | 340/825 |
| 5,010,330 | 4/1991 | Snowden et al. | 340/825 |
| 5,327,486 | 7/1994 | Wolff et al. | 379/93.23 |
| 5,636,211 | 6/1997 | Newlin et al. | 370/465 |
| 5,675,507 | 10/1997 | Bobo, II | 395/200.36 |
| 5,742,668 | 4/1998 | Pepe et al. | 379/58 |
| 5,742,905 | 4/1998 | Pepe et al. | 455/461 |
| 5,793,762 | 8/1998 | Penners et al. | 370/389 |
| 5,835,577 | 11/1998 | Disanto et al. | 379/93.19 |
| 5,884,312 | 3/1999 | Dustan et al. | 707/10 |

OTHER PUBLICATIONS

"WebPhone" product literature, NetSpeak Corporation, 1996.

*Primary Examiner*—Chi H. Pham
*Assistant Examiner*—Kwang B. Yao
*Attorney, Agent, or Firm*—Andrew S. Fuller

[57] ABSTRACT

A communication system (101) provides a subscriber unit (105) with access to an information network (130) through gateway equipment (110) that is coupled to a network server (120). The subscriber unit (105) transmits to the gateway equipment (110) a request for data from the information network (130). The gateway equipment (110) communicates the request in a message to the network server (120), the message including an identifier for the originating subscriber unit. The network server (120) retrieves data corresponding to the request from the information network (130), and conveys this data to the subscriber unit (105) using the identifier. Preferably, the network server (120) communicates with the subscriber unit (105) via a message service (140) that provides external access to the communication system (101).

18 Claims, 4 Drawing Sheets

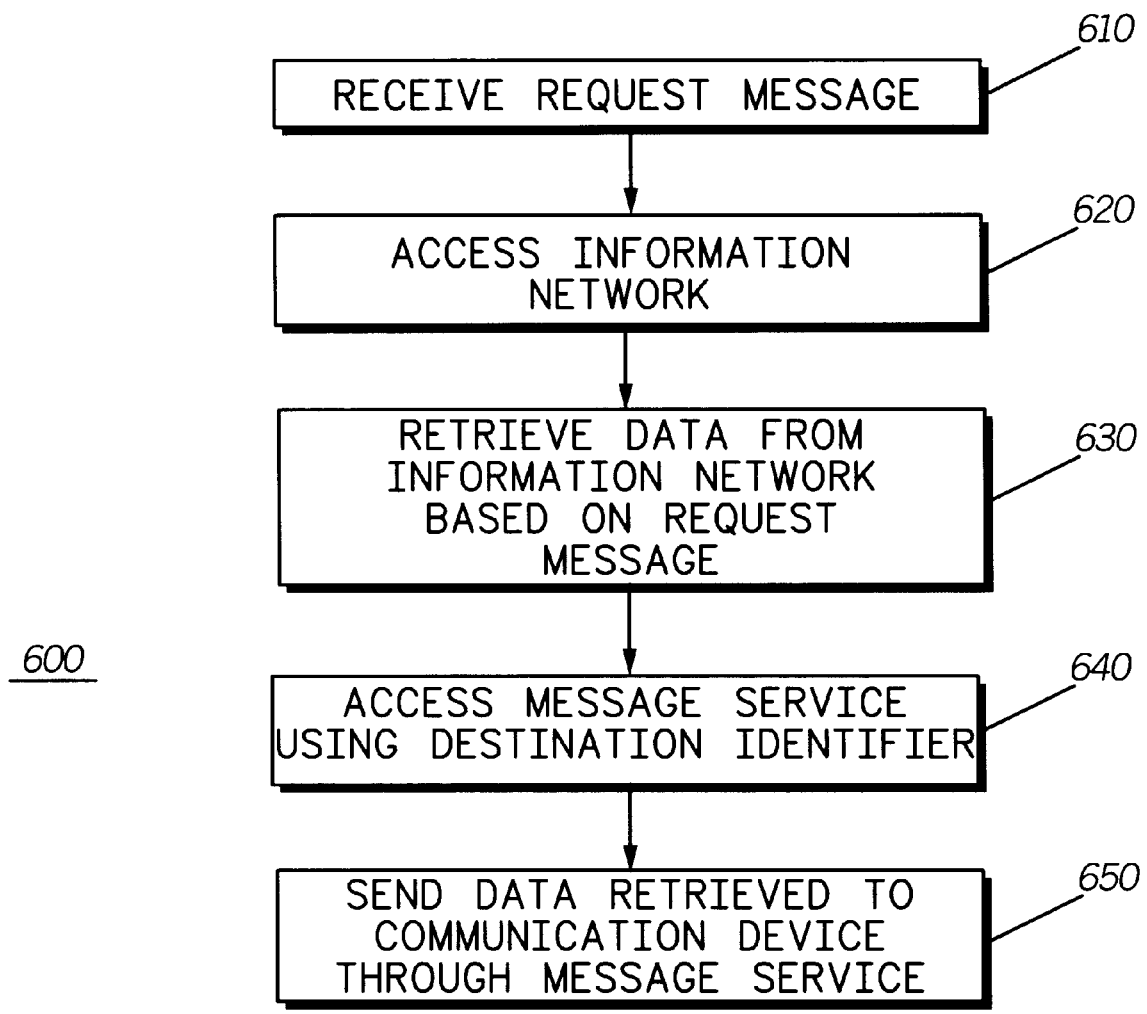

METHOD FOR ACCESSING AN INFORMATION NETWORK FROM A RADIO COMMUNICATION SYSTEM

TECHNICAL FIELD

This invention relates in general to radio communication systems, and more particularly, to providing accessing external information sources from a radio communication device.

BACKGROUND OF THE INVENTION

Radio communication devices, particularly hand-held two-way radios, portable telephones, and pagers, are fast becoming a staple of modern society. It is not uncommon to have one or more of such devices on one's person in order to maintain vital communication links. There has been an increased desire to have the functions provided by such devices integrated into a single device, and for the single device to provide access to a variety of information sources in addition to its basic communication functions. For example, it is known in the art to provide a one-way radio device, such as a pager, with periodic broadcasts of information from a variety of sources, in addition to standard paging functions. This type of information is generally available to communication devices that support paging services.

While broadcast service is satisfactory for the information requirements of some, the need for customized information has made such service inadequate for others. For many, it is essential to have ready access to a wide array of information sources available through public or private access networks. Although such access is common for users of networked computing devices, these information sources have traditionally not been available to users of radio communication devices used primarily for voice communications. Radio communication devices tend to be designed for operation in tightly coupled systems using narrow band and low bandwidth channels. These channels represent communication resources that must be carefully managed to ensure delivery of high priority functions.

With the increasing demand for integrated services, it is desirable to provide access to data on external information networks for a two-way communication device operating within a tightly coupled radio communication system. Such access should be provided in a manner that facilitates ease of use and that minimizes impact on higher priority functions of the communication system.

BRIEF DESCRIPTION OF THE DRAWINGS

FIG. 6 is a flowchart of procedures for a network server, in accordance with the present invention.

DETAILED DESCRIPTION OF THE PREFERRED EMBODIMENT

The present invention provides a method for accessing an information network from a communication device operating within a radio communication system. The method involves the use of gateway equipment that is coupled to an external or network server having access to the information network. The communication device obtains a request for data from the information network, and transmits a corresponding message, including the request, on a wireless communication channel. At the gateway equipment, the request is received and a determination is made that the request corresponds to the information network. The originating communication device is identified, preferably by telephone number or other suitable identifier, and a request message, which includes the identifier, is transmitted to the external network server for processing. The network server retrieves information from the information network corresponding to the request message and initiates a communication using the identifier to convey the data retrieved to the originating communication device. Preferably, the identifier is a telephone number that is used to communicate with the originating communication device via a message service that provides external access to the radio communication system.

Figure 1:
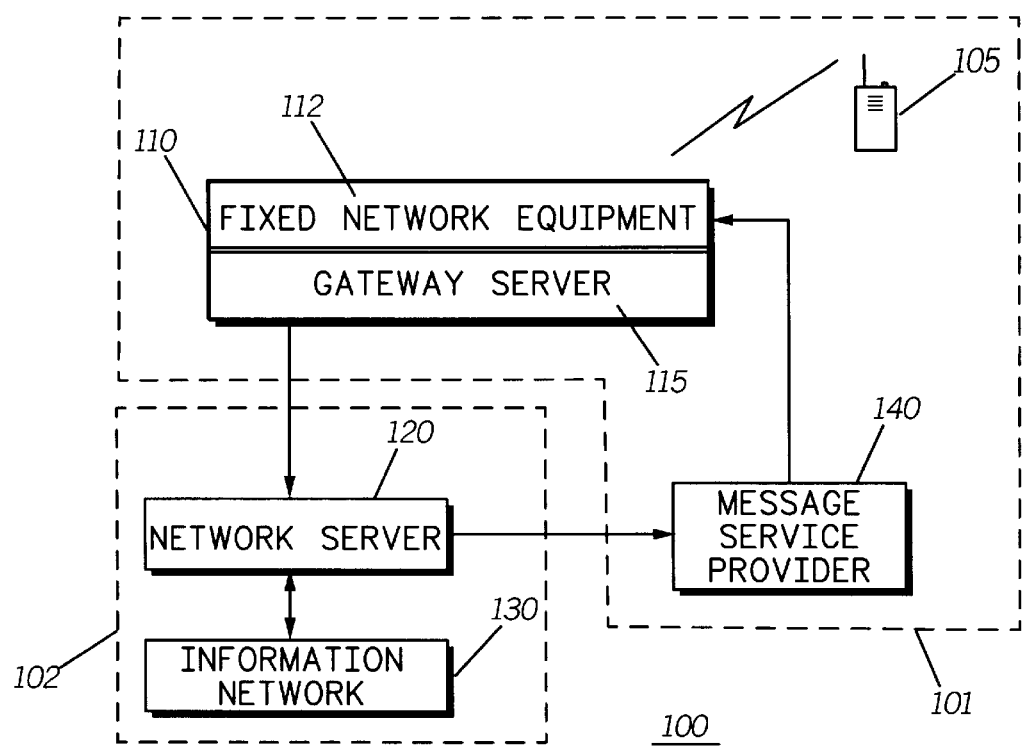
FIG. 1 is a block diagram of a radio communication environment, in accordance with the present invention.

FIG. 1 shows a block diagram of a communication environment 100. The communication environment 100 includes a two-way radio communication system 101 that is interfaced with information network equipment 102 in accordance with the present invention. The radio communication system 101 includes a radio communication device 105, fixed network equipment (FNE) 112, a gateway server 115, and a message service provider 140. The FNE 112 comprises fixed infrastructure communication equipment that provides control functions for operating the radio communication system. In the preferred embodiment, the FNE 112 includes a trunked system controller with a well-known operation as is commonly found in the art. The radio communication device 105 interfaces with the FNE 112 via a wireless communication link to provide two-way communication services. The communication device 105 is a subscriber unit within the radio communication system 101 which communicates with the FNE 112 according to a predefined protocol. The protocol enables several communication devices to concurrently operate within the system 101. Preferably, the radio communication device 105 works in conjunction with the FNE 112 to provide a user with services such as telephone interconnect, paging or short message service, dispatch or instant conferencing, and data. Paging or short message service is provided through the message service provider 140, which includes equipment that interfaces with the FNE 112. The message service provider 140 is operable to convey externally sourced messages to the communication device 105. In the preferred embodiment, the message service provider 140 is a short message service center that uses a telephone number or other identifier corresponding to the communication device 105 to route messages to the communication device in a public access manner.

The FNE 112 interfaces with the gateway server 115, and together form gateway equipment 110 that provides a channel to request externally sourced information via the information network equipment 102. The gateway server preferably incorporates a database enabling conversion of identifiers used for communication between the FNE 112 and the communication device 105 to public access numbers, if such conversion is necessary. For example, private call identifiers or radio identifiers may be converted to telephone numbers to enable public access to a particular radio communication device.

The information network equipment 102 includes a network server 120 that is coupled to an information network 130. The network server 120 is coupled to the message service provider 140 through a permanent or temporary connection. The network server 120 is preferably a rules based server that is coupled to the information network and that is operable to retrieve data from the information network, according to network access commands or predefined request codes. An example of such a server is the MEMOS™ rules based server that is commercially available from Motorola, Inc. The information network may be a public access network, such as the internet, or a private access network such as an intranet or other private data networks. In the preferred embodiment, the information network comprises internet sites which are commonly referred to a world wide web information sites.

Figure 2:
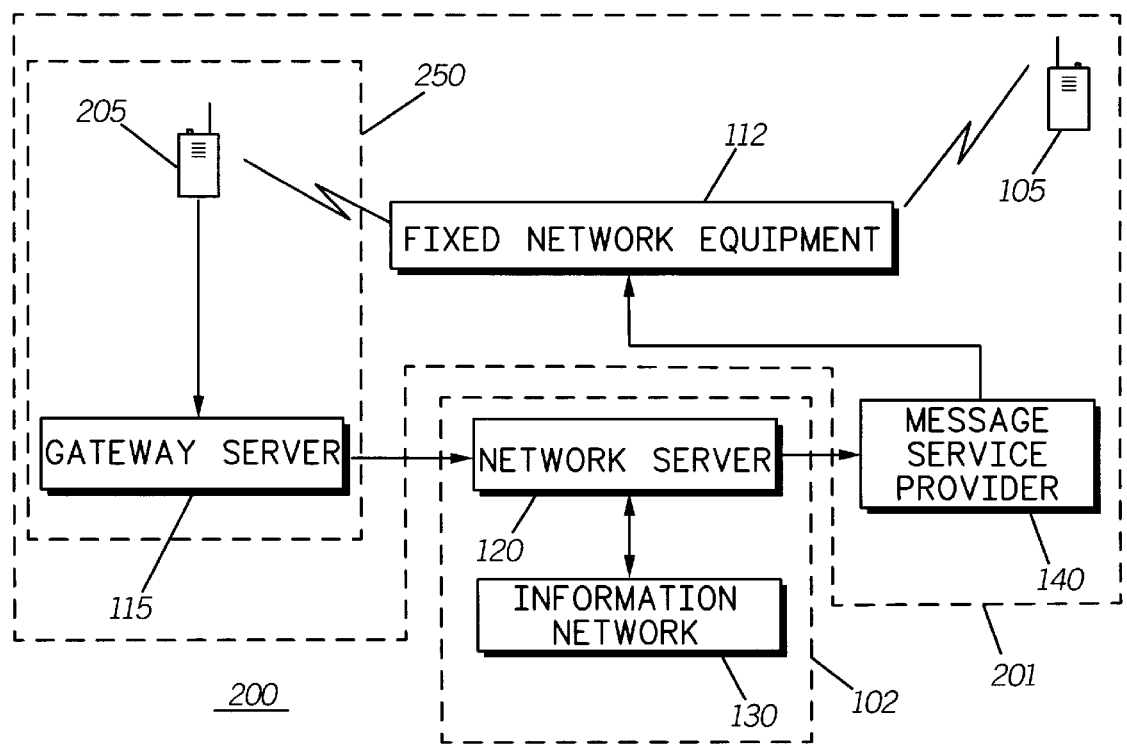
FIG. 2 is a block diagram of a second embodiment of the radio communication environment of FIG. 1, in accordance with the present invention.

FIG. 2 shows a radio communication environment 200 with an alternative configuration of a radio communication system 201, in accordance with the present invention. In this configuration, the gateway server 115 is not associated with the fixed network equipment 112. Rather, a second communication device 205, such as a mobile or portable radio communication device, is employed to perform gateway functionality. This second communication device 205 is coupled to the gateway server 115 to form gateway equipment 250 with functionality as described above. In this embodiment, the communication device 205 is preferably a specially modified or adapted two-way radio subscriber unit that communicates with the fixed network equipment 112 in a similar manner to the other communication device 105. The combination of the radio communication device 205 and the gateway server 115 provides gateway equipment for accessing the network server 120 and ultimately the information network 130. In other respects, the radio communication environment 200 operates in similar fashion to the radio communication environment 100.

Figure 3:
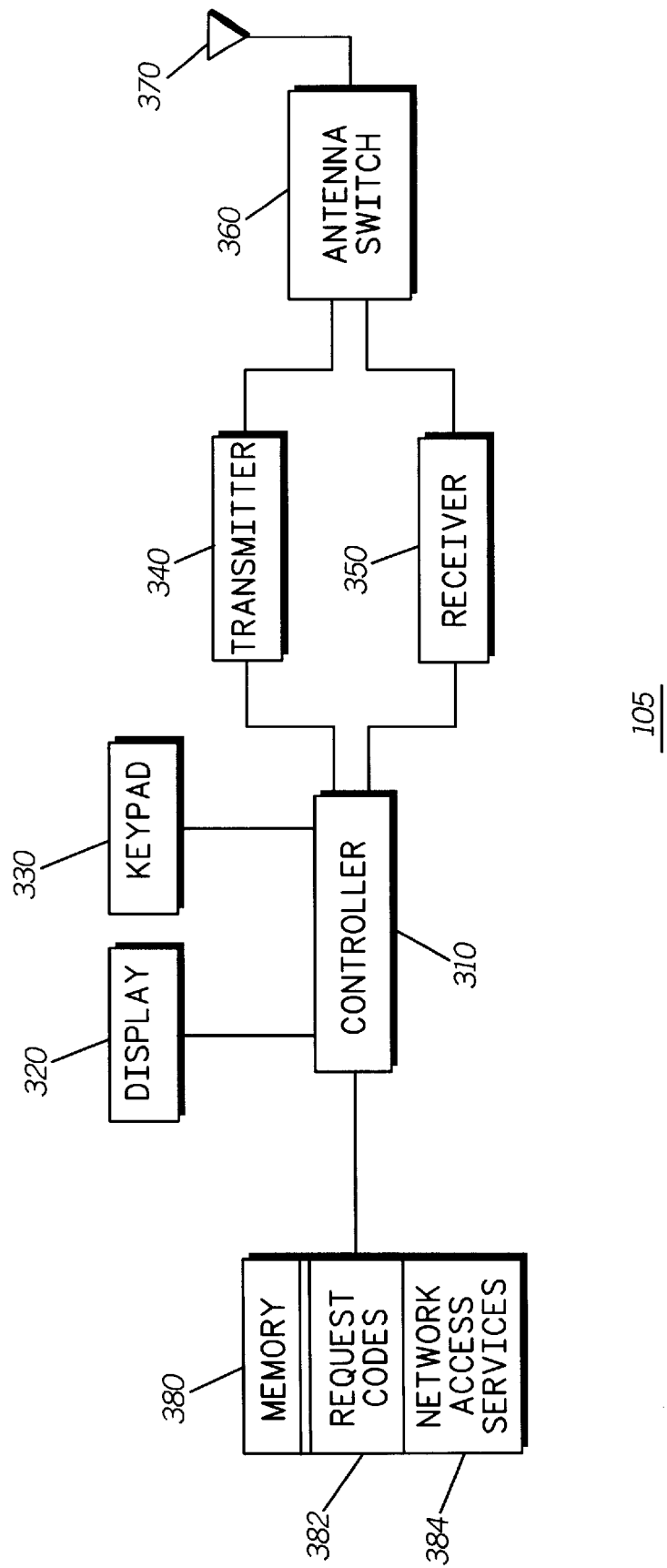
FIG. 3 is a block diagram of a radio communication device, in accordance with the present invention.

FIG. 3 shows a block diagram of the communication device 105, which is operable to access information on an external information network. The communication device 105 is a two-way radio or radio telephone that is operable to provide telephone interconnect, paging, dispatch and data services. In the radio 105, a controller 310 is coupled to a memory 380, to a transmitter 340, and to a receiver 350. The transmitter 340 and receiver 350 are coupled via an antenna switch 360 to an antenna 370. For transmit operations, the controller 310 configures the antenna switch 360 to couple the transmitter to the antenna 370. Similarly, for receive operations, the controller 310 couples the antenna 370 via the antenna switch 360 to the receiver 350. Receive and transmit operations are conducted under instructions stored in the memory 380. The radio 105 also includes a display 320 and a keypad 330 that provide a user interface for controlling the radio.

According to the present invention, the radio 105 also includes a set of network access service descriptors 384 and associated request codes 382 that are used to retrieve data from an external information network. The network access services are selectable using the user interface 320, 330. The keypad 330 is used to initiate a request for a network access service, and the display 320 used to provide the resultant information to the user. The table below represents an example of the database stored within the radio 105 that associates request codes to network access service descriptors:

| Request code | Service |
| --- | --- |
| 00 | stock quotes |
| 01 | sports scores |
| 02 | weather |
| 03 | phone lists |

In the preferred embodiment, the radio 105 uses status message numbers to facilitate intra-system communication, and the request codes correspond to specially designated status message numbers.

Figure 4:
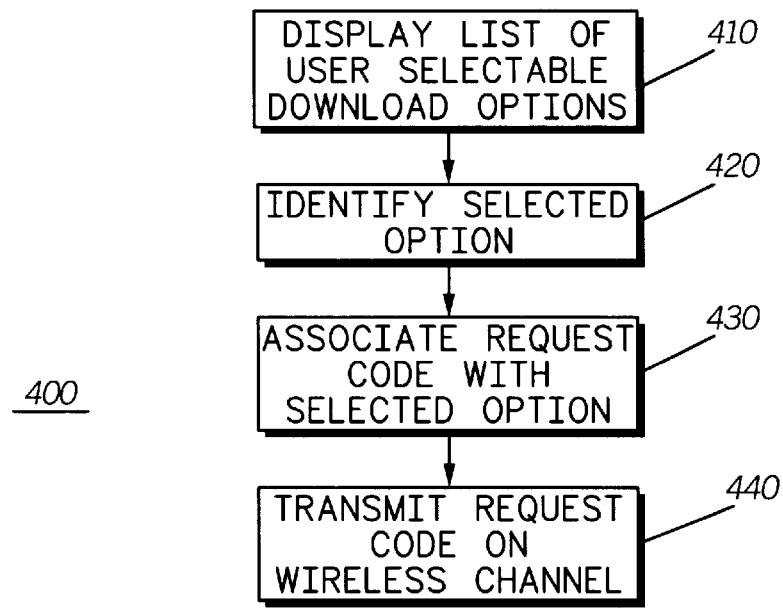
FIG. 4 is a flowchart of procedures for the radio communication device of FIG. 3, in accordance with the present invention.

FIG. 4 is flowchart of procedures 400 used at the communication device 105 to access network services, in accordance with the present invention. Ordinarily, a user operates the communication device to display a list of selectable options for data retrieval or other network access options with respect to the information network, step 410. The communication device identifies a selected option from the list of user selectable options, step 420, and preferably associates a request code with the selected option, step 430. In a typical example, the communication device processes a request for data from the internet, or other information network, and obtains a request code identifying the data for retrieval from the internet. The request code is then transmitted on a wireless communication channel to gateway equipment for further processing. In one embodiment, the gateway equipment includes a controller, such as may be implemented with fixed network equipment in combination with gateway server software and/or hardware, which together operate to convey the request to an external network server. In another embodiment, the gateway equipment is separate from the controller and is implemented using a communication device operating as a subscriber unit within the communication system. This communication device, together with additional gateway hardware and software, function as a conduit for network access requests.

Figure 5:
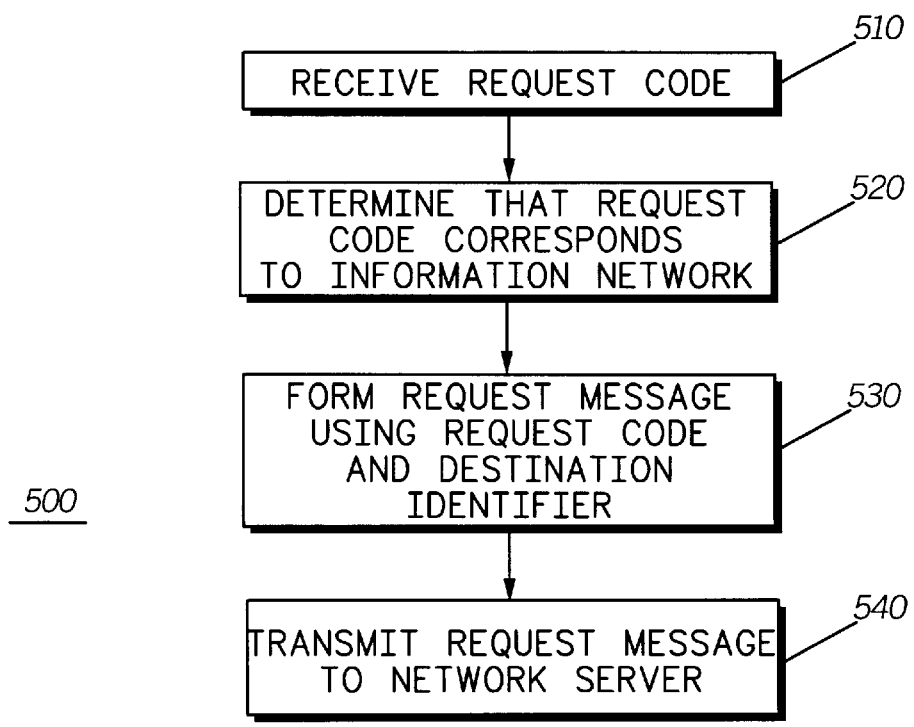
FIG. 5 is a flowchart of procedures for communication equipment that functions as a gateway server, in accordance with the present invention.

FIG. 5 is a flowchart of procedures 500 showing operation of the gateway equipment, in accordance with the present invention. The gateway equipment receives the request code on the wireless communication channel, step 510, and determines that the request code corresponds to the information network, step 520. Generally, the request code will be transmitted with an identifier which identifies the originating communication device internally within the radio communication system. In one embodiment, the request code represents status number messages which have been designated in the system to correspond to information network requests. The gateway equipment forms a request message using the request code and a destination address corresponding to the originating communication device, step 530. The destination address is preferably a telephone number or other such identifier which can be used to directly address messages to the originating communication device from sources external to the radio communication system. Thus, a standard support service such as a short message service can be accessed via this identifier to send externally sourced messages to the originating communication device. The request message is transmitted to the network server which has an interface to the information network, step 540.

FIG. 6 is a flowchart of procedures 600 used at the network server, in accordance with the present invention. The network server receives a request message communicated from the gateway equipment, step 610. The request message results in the accessing of the information network, step 620. The network server operates to retrieve data or otherwise access the information on the information network based on the request message, step 630. In the preferred embodiment, the network server formats an internet access command based on the request message, and accesses an internet site using the internet access command. When data is retrieved from the information network, the network server accesses a message service using the destination identifier received as part of the request message, step 640. The data retrieved from the network is sent to the originating communication device through the message service using the corresponding destination identifier, step 650. Thus, information accessed from the network is communicated to the originating device via a message service that provides an external interface through the radio communication system to the originating communication device.

The present invention provides significant advantages over the prior art. Access to external information networks is provided to a radio communication device in a tightly coupled communication environment without significant impact on the design or operation of such a system. By configuring gateway equipment to interface with an external network access server, and by routing data retrieved from the network through an external access message service to a particular radio, a path is provided for network access with substantial capability and minimum impact on radio system design.

What is claimed is:

1. In a radio communication system, a method for accessing an information network comprising the steps of:
   providing gateway equipment with an interface to an external server having access to the information network;
   at a two-way radio device operating within the radio communication system:
      processing a request for data from the information network;
      obtaining a request code identifying data for retrieval from the information network;
      transmitting the request code on a wireless communication channel;
   at the gateway equipment:
      receiving the request code on the wireless communication channel;
      determining that the request code corresponds to the information network;
      transmitting a request message to the external server, which request message is derived in part from request code and which includes an identifier for the two-way radio device;
   at the external server:
      retrieving data from the information network corresponding to the request message; and
      communicating the data retrieved to the two-way radio device using the identifier using a service that provides one-way access to the two-way radio device.

2. The method of claim 1, wherein the identifier comprises a telephone number.

3. The method of claim 1, wherein the two-way radio device comprises a two-way radio telephone.

4. The method of claim 3, wherein the gateway equipment comprises fixed infrastructure communication equipment that provides an interface for the two-way radio telephone to conduct communications within the radio communication system.

5. The method of claim 3, wherein the gateway equipment comprises a two-way radio telephone.

6. The method of claim 1, wherein the step of communicating the data retrieved comprises the step of transmitting the data to the gateway equipment via a short message service associated with first the two-way radio device.

7. The method of claim 1, wherein the step of retrieving data from the information network, comprises the steps of:
   formatting an internet access command based on the request message; and
   accessing an internet site using the internet access command.

8. A method, comprising the steps of:
   providing a radio communication system having a subscriber unit, and gateway equipment having access to a network server that interfaces with an information network;
   at the subscriber unit:
      displaying a list of user selectable options for data retrieval from the information network;
      identifying a selected option from the list of user selectable options;
      associating a request code with the selected option;
      establishing two-way wireless communication link with the gateway equipment,
      transmitting the request code to the gateway equipment using the two-way wireless communication link;
   at the gateway equipment:
      receiving the request code on the wireless communication channel;
      forming a request message using the request code and a destination address corresponding to the subscriber unit;
      transmitting the request message to the network server;
   at the network server:
      retrieving data from the information network based on the request message; and
      communicating the data to the subscriber unit via a message service that provides an external interface for a one-way communication link to the subscriber unit, wherein the data to the subscriber unit is not routed through the gateway equipment.

9. The method of claim 8, wherein the destination address comprises a telephone number.

10. The method of claim 9, wherein the gateway equipment comprises a two-way radio telephone.

11. The method of claim 10, wherein the gateway equipment comprises fixed infrastructure communication equipment that provides an interface for the two-way radio telephone to conduct communications within the radio communication system.

12. The method of claim 11, wherein the step of communicating the data comprises the step of transmitting the data to the subscriber unit via a short message service.

13. The method of claim 12, wherein the information network comprises internet sites.

14. A method, comprising the steps of:
   providing a radio communication system having a subscriber unit, and gateway equipment having access to a network server that interfaces with an information network;
   at the subscriber unit:
      receiving from a user a request for information from an information network;
      transmitting the request to the gateway equipment via a wireless communication channel;
   at the gateway equipment, automatically:
      receiving the request via the wireless communication channel;

forming a request message based on the request, which request message includes a destination address corresponding to the subscriber unit; and transmitting the request message to the network server;

at the network server, automatically:

retrieving data from the information network based on the request message; and communicating the data to the subscriber unit via a short message service that provides access to the subscriber unit.

15. The method of claim 14, wherein the destination address comprises a telephone number.

16. The method of claim 14, wherein the gateway equipment comprises a two-way radio telephone that functions as a subscriber unit within the radio communication system.

17. The method of claim 14, wherein the gateway equipment comprises fixed infrastructure communication equipment that provides an interface for the two-way radio telephone to conduct communications within the radio communication system.

18. The method of claim 14, wherein the information network comprises internet sites.

* * * * *